US010816439B2

(12) United States Patent
Yoon et al.

(10) Patent No.: US 10,816,439 B2
(45) Date of Patent: Oct. 27, 2020

(54) METHODS OF TESTING WASHING MACHINE APPLIANCES

(71) Applicant: Haier US Appliance Solutions, Inc., Wilmington, DE (US)

(72) Inventors: Je Kwon Yoon, Seongnam (KR); Ryan Ellis Leonard, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 408 days.

(21) Appl. No.: 15/790,233

(22) Filed: Oct. 23, 2017

(65) Prior Publication Data

US 2019/0120725 A1   Apr. 25, 2019

(51) Int. Cl.

| | | |
|---|---|---|
| *D06F 39/00* | (2020.01) | |
| *G01M 99/00* | (2011.01) | |
| *D06F 39/08* | (2006.01) | |
| *D06F 39/02* | (2006.01) | |
| *D06F 13/02* | (2006.01) | |
| *D06F 37/30* | (2020.01) | |
| *D06F 37/40* | (2006.01) | |
| *D06F 37/12* | (2006.01) | |
| *D06F 37/42* | (2006.01) | |
| *D06F 33/00* | (2020.01) | |

(Continued)

(52) U.S. Cl.
CPC ........... *G01M 99/005* (2013.01); *D06F 13/02* (2013.01); *D06F 33/00* (2013.01); *D06F 34/28* (2020.02); *D06F 37/12* (2013.01); *D06F 37/304* (2013.01); *D06F 37/40* (2013.01); *D06F 37/42* (2013.01); *D06F 39/022* (2013.01); *D06F 39/085* (2013.01); *D06F 39/087* (2013.01); *D06F 39/088* (2013.01); *D06F 23/04* (2013.01); *D06F 2202/04* (2013.01); *D06F 2202/065* (2013.01); *D06F 2202/085* (2013.01); *D06F 2204/065* (2013.01); *D06F 2204/084* (2013.01); *D06F 2204/088* (2013.01); *D06F 2212/02* (2013.01); *D06F 2222/00* (2013.01)

(58) Field of Classification Search
USPC ...................................... 73/865, 9
See application file for complete search history.

(56) References Cited

U.S. PATENT DOCUMENTS 9,453,299 B2    9/2016  Park et al.
10,465,324 B1 * 11/2019  Dillon .................. G05B 19/042
(Continued)

FOREIGN PATENT DOCUMENTS

| JP | 4873021 B2 | 2/2012 |
|---|---|---|
| KR | 1019910013531 | 3/1993 |
| KR | 940003814 B1 | 5/1994 |

OTHER PUBLICATIONS

LG Dryer—Understanding Sensor Dry; posted at YouTube.com; posting date not given, (online), (site visited Oct. 23, 2017). Available from Internet, http://youtube.com/watch?v=3XwFt9Wwb3Q.

*Primary Examiner* — Peter J Macchiarolo
*Assistant Examiner* — Mohammed E Keramet-Amircolai
(74) *Attorney, Agent, or Firm* — Dority & Manning, P.A.

(57) ABSTRACT

A method of testing a washing machine appliance includes performing a first fill test, performing a second fill test, performing an agitate test, performing a drain test, and performing a spin test. Each of the steps of performing the first fill test, performing the second fill test, performing the agitate test, performing the drain test, and performing the spin test are performed in a continuous process.

14 Claims, 6 Drawing Sheets

(51) Int. Cl.
*D06F 34/28* (2020.01)
*D06F 23/04* (2006.01)

(56) References Cited

U.S. PATENT DOCUMENTS

| | | | |
|---|---|---|---|
| 2004/0095370 A1 | 5/2004 | Broker et al. | |
| 2006/0185403 A1* | 8/2006 | Ikemizu | D06F 35/003 68/12.18 |
| 2008/0282479 A1* | 11/2008 | Darby | D06F 39/087 8/159 |
| 2010/0202741 A1* | 8/2010 | Ryan | G02B 6/447 385/113 |
| 2011/0017785 A1* | 1/2011 | Carman | F27D 3/145 222/606 |
| 2013/0063011 A1* | 3/2013 | Kozinski | A47L 15/4261 312/319.2 |
| 2013/0185079 A1* | 7/2013 | Park | G10L 15/26 704/275 |
| 2015/0267341 A1* | 9/2015 | Hettinger | D06F 35/005 8/137 |
| 2015/0292136 A1* | 10/2015 | Leonard | D06F 33/02 8/147 |
| 2015/0292137 A1* | 10/2015 | Leonard | G01G 9/00 702/173 |
| 2015/0292138 A1* | 10/2015 | Leonard | D06F 39/088 8/137 |
| 2016/0201242 A1* | 7/2016 | Leonard | D06F 33/02 8/137 |
| 2016/0206173 A1* | 7/2016 | Durham | A47L 15/4202 |
| 2016/0215429 A1* | 7/2016 | Hettinger | D06F 33/02 |
| 2016/0313360 A1* | 10/2016 | Bouteffah-Touiki | G01N 35/1004 |
| 2016/0369446 A1* | 12/2016 | Leonard | D06F 39/003 |

* cited by examiner

METHODS OF TESTING WASHING MACHINE APPLIANCES

FIELD OF THE INVENTION

The present subject matter relates generally to washing machine appliances, and more particularly to methods of testing a washing machine appliance for proper installation and functionality.

BACKGROUND OF THE INVENTION

Washing machine appliances generally require a multi-step installation process before being used for the first time in a new location. For example, multiple connections are required, including both plumbing and electrical connections. Additionally, washing machine appliances generally include numerous working parts and are configured for several different modes and stages of operation. Thus, a washing machine appliance is typically tested after installation to confirm correct installation and complete functionality of the washing machine appliance.

It is common practice to test the washing machine appliance after installation by running a full operational cycle of the washing machine appliance. However, this practice consumes a significant amount of both time and resources. One of example of such resources is the water used for testing the appliance rather than cleaning articles. Additionally, where the installation procedure is performed by an installer other than the end user, the installer may be delayed from additional appointments while waiting for the full operational cycle to complete and/or may not be able to observe the entirety of the full operation cycle due to time constraints.

In some instances, it may be possible to separately test individual washing machine appliance components or specific portions of a full operational cycle. For example, a test of a complete spin cycle operation may be performed separately and independently of a test of a complete fill and/or drain operation. However, such piecemeal testing provides incomplete information about the status and functionality of the washing machine appliance when the washing machine appliance is first installed.

Accordingly, a brief but comprehensive test for newly-installed washing machine appliances is desirable.

BRIEF DESCRIPTION OF THE INVENTION

The present invention provides a single test method which can verify installation and functionality of a washing machine appliance while using a minimal amount of time and resources. Additional aspects and advantages of the invention will be set forth in part in the following description, or may be obvious from the description, or may be learned through practice of the invention.

In one aspect of the present disclosure, a method of testing a washing machine appliance is provided. The method includes performing a first fill test, performing a second fill test, performing an agitate test, performing a drain test, and performing a spin test. Each of the steps of performing a first fill test, performing a second fill test, performing an agitate test, performing a drain test, and performing a spin test are performed in a continuous process.

In another aspect of the present disclosure, a method of testing a washing machine appliance is provided. The method includes performing a first fill test, performing a second fill test, performing an agitate test, performing a drain test, and performing a spin test. A total time duration for all of the steps of performing a first fill test, performing a second fill test, performing an agitate test, performing a drain test, and performing a spin test is less than about fifteen minutes These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
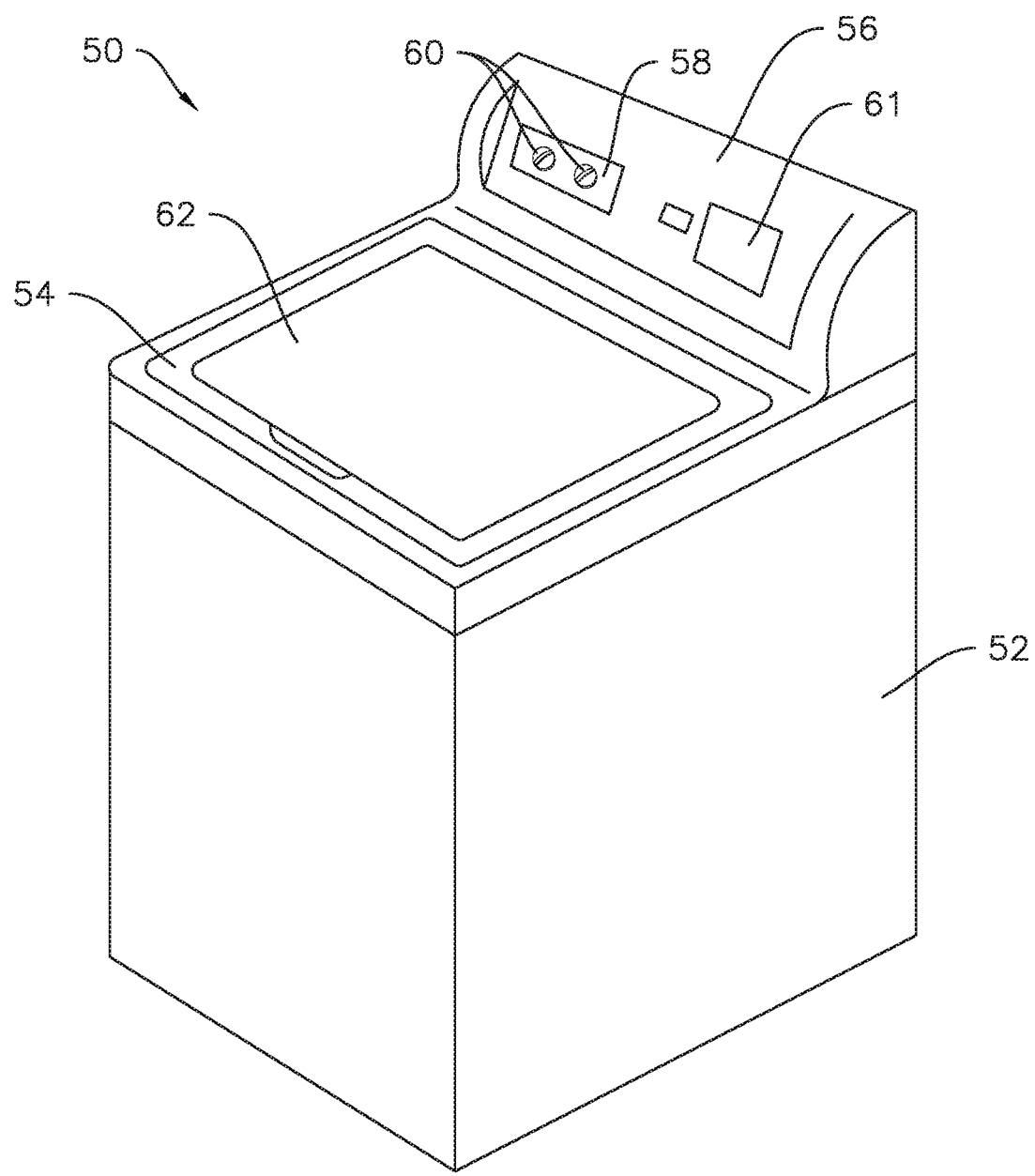
FIG. 1 provides a perspective view of a washing machine appliance according to example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
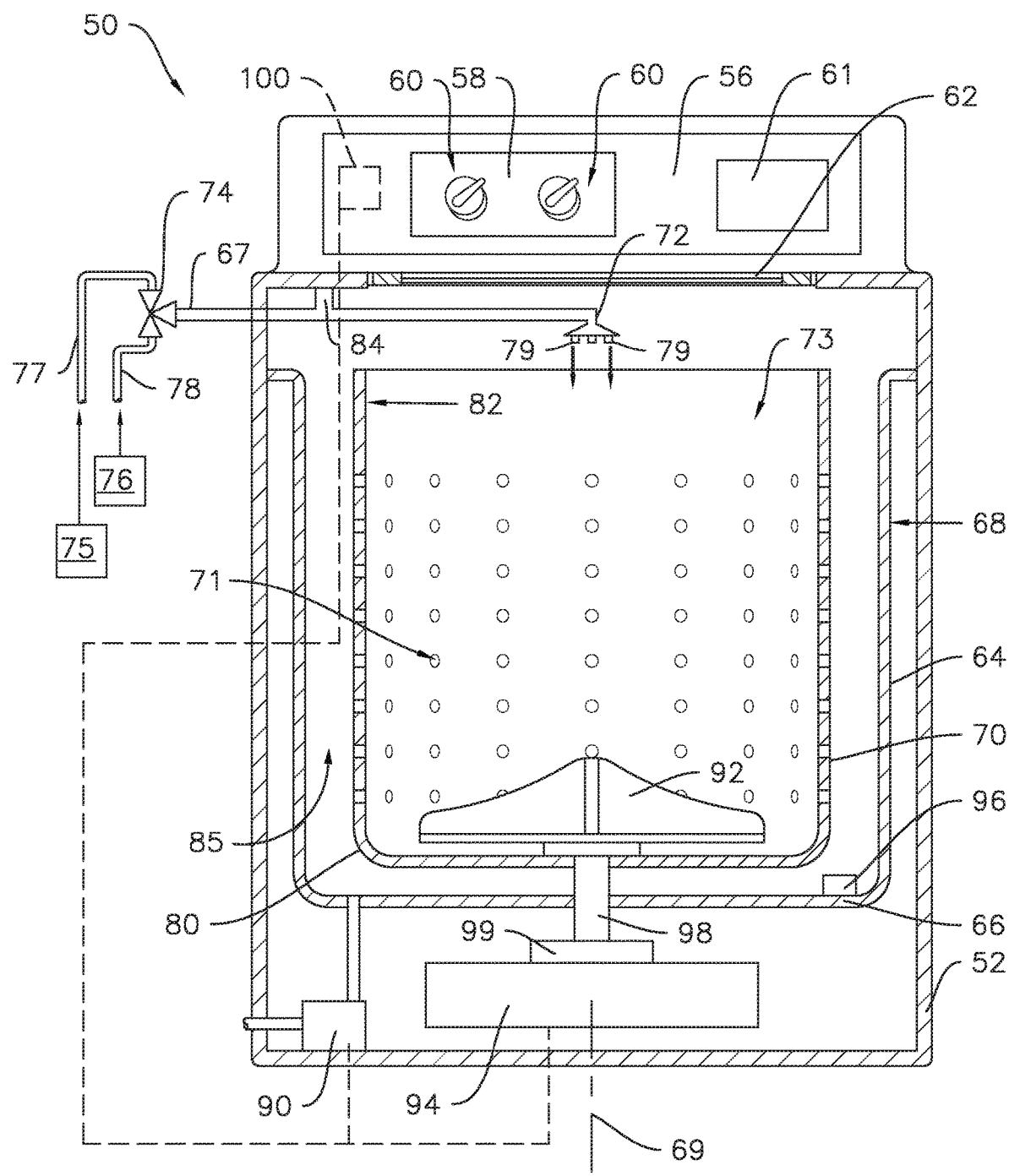
FIG. 2 provides a front cross-sectional view of the washing machine appliance of FIG. 1.

FIG. 1 is a perspective view of a washing machine appliance 50 according to an example embodiment of the present disclosure. FIG. 2 provides a front, cross-sectional view of washing machine appliance 50. As may be seen in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface for operator selection of machine cycles and features. In some embodiments, a display 61 indicates selected features, a countdown timer, and/or other items of interest to users. A door 62 is mounted to cover 54 and is rotatable between an open position (not shown) facilitating access to a wash tub 64 (FIG. 2) located within cabinet 52 and a closed position (shown in FIG. 1) forming an enclosure over tub 64.

As may be seen in FIG. 2, tub 64 includes a bottom wall 66 and a sidewall 68. A wash drum or wash basket 70 is rotatably mounted within tub 64, defining an annulus 85 between the tub 64 and basket 70. In particular, basket 70 is rotatable about a central axis 69, which may, when properly balanced and positioned in the embodiment illustrated, be a vertical axis. Thus, washing machine appliance 50 is generally referred to as a vertical axis washing machine appliance. Basket 70 defines a wash chamber 73 for receipt of a load of articles for washing and extends, e.g., vertically, between a bottom portion 80 and a top portion 82. Basket 70 includes a plurality of openings or perforations 71 therein to facilitate fluid communication between an interior of basket 70 and tub 64.

In some embodiments, nozzle 72 is configured for flowing or directing a liquid into tub 64. In particular, nozzle 72 may be positioned at or adjacent top portion 82 of basket 70. Nozzle 72 may be in fluid communication with one or more water sources 75, 76 in order to direct liquid (e.g., water) into tub 64 and/or onto articles within chamber 73 of basket 70. For instance, a water inlet line 67 may connect to water sources 75, 76 to selectively receive water therefrom. Nozzle 72 may further include apertures 79 through which water may be sprayed into the tub 64. Apertures 79 may, for example, be tubes extending from the nozzles 72, as illustrated. Alternatively, apertures 79 may simply be holes defined in the nozzles 72 or any other suitable openings through which water may be sprayed. Nozzle 72 may additionally include other openings, holes, etc. (not shown) through which water may be flowed (i.e., sprayed or poured) into the tub 64.

A main valve 74 generally regulates the flow of liquid (e.g., water) through nozzle 72. For example, valve 74 can selectively adjust to a closed position in order to terminate or obstruct the flow of liquid through nozzle 72. When assembled and installed for use, the main valve 74 may be in fluid communication with one or more external liquid sources, such as a cold water source 75 and a hot water source 76. The cold water source 75 may, for example, be a commercial water supply, while the hot water source 76 may be, for example, a water heater. Such external water sources 75, 76 may supply water to the appliance 50 through the main valve 74. A cold water conduit 77 and a hot water conduit 78 may supply cold and hot water, respectively, from the sources 75, 76 through valve 74. Valve 74 may further be operable to regulate the flow of hot and cold liquid, and thus the temperature of the resulting liquid flowed into tub 64, such as through the nozzle 72.

An enclosed additive dispenser 84 may optionally be mounted or enclosed within cabinet 52 for directing an additive, such as detergent, bleach, liquid fabric softener, etc., into the tub 64. As illustrated, an enclosed dispenser 84 may be in fluid communication with nozzle 72 within cabinet 52. For instance, dispenser 84 may be in fluid communication with nozzle 72 such that water flowing through nozzle 72 flows through dispenser 84, mixing with additive at a desired time during operation to form a wash fluid, before being flowed into tub 64, e.g., through apertures 79. In alternative embodiments, nozzle 72 and dispenser 84 may be integral and directed into annulus 85, with a portion of dispenser 84 serving as the nozzle 72. In other alternative embodiments, a dispenser may be in fluid communication with annulus 85 separate from nozzle 72. Additive may thus be added from the dispenser by flowing directly from the dispenser into the annulus 85, while liquid is supplied to chamber 73 from nozzle 72. In further alternative embodiments, no additive dispenser is mounted or enclosed within cabinet 52.

A drain pump assembly 90 (shown schematically in FIG. 2) is located beneath tub 64 and basket 70 for gravity assisted flow from tub 64 to drain pump assembly 90. An agitation element 92, shown as an impeller in FIG. 2, may be disposed in basket 70 to impart an oscillatory motion to articles and liquid in chamber 73 of basket 70. In example embodiments, agitation element 92 includes a single action element (i.e., oscillatory only), double action (oscillatory movement at one end, single direction rotation at the other end) or triple action (oscillatory movement plus single direction rotation at one end, single direction rotation at the other end). As illustrated in FIG. 2, agitation element 92 is oriented to rotate about axis 69. Alternatively, basket 70 may provide such agitating movement, e.g., such that agitation element 92 is not required. In some embodiments, basket 70 and agitation element 92 are driven by a motor 94. Motor 94 may, for example, be a pancake motor, direct drive brushless motor, induction motor, or other motor suitable for driving basket 70 and agitation element 92. In some embodiments, motor 94 may be connected to basket 70 via a mode shifter 99. The mode shifter 99 may be selectively movable into and out of engagement with the basket 70. For example, the mode shifter 99 may engage the basket 70 so that basket 70 can be rotated by motor 94 during a spin cycle, and mode shifter 99 may disengage the basket 70 during an agitation cycle so that the motor 94 rotates the agitation element 92 independent of the basket 70. As motor output shaft 98 is rotated, basket 70 and agitation element 92 are operated for rotatable movement within tub 64, e.g., about axis 69. Washing machine appliance 50 may also include a brake assembly (not shown) selectively applied or released for respectively maintaining basket 70 in a stationary position within tub 64 or for allowing basket 70 to spin within tub 64.

Various sensors may additionally be included in the washing machine appliance 50. For example, a pressure sensor 96 may be positioned in the tub 64 as illustrated. Any suitable pressure sensor 96, such as an electronic sensor, a manometer, or another suitable gauge or sensor, may be utilized. The pressure sensor 96 may generally measure the pressure of water in the tub 64. This pressure can then be utilized to estimate the height or level of water in the tub 64. Additionally, a suitable speed sensor (not shown) can be provided to measure rotational speed of basket 70 and/or agitation element 92. Other suitable sensors, such as temperature sensors, etc., may additionally be provided in the washing machine appliance 50. The structure and function of such sensors is generally understood by those of skill in the art, and as such will not be described in further detail herein.

Operation of washing machine appliance 50 is generally controlled by an appliance processing device or controller 100 that is in communication with (e.g., electrically coupled to) the input selectors 60 56 for user manipulation to select washing machine cycles and features. As illustrated, the input selectors 60 may be knobs or dials. In various embodiments, the input selectors 60 may include one or more user input devices, such as switches, buttons, touchscreen interfaces, etc., as well as or instead of the illustrated example input selectors 60. Appliance controller 100 may further be in communication with (e.g., electrically coupled to) various other components of appliance 50, such as main valve 74, pump assembly 90, motor 94, and one or more suitable sensors, etc. In response to user manipulation of the input selectors 60, appliance controller 100 may operate the various components of washing machine appliance 50 to execute selected machine cycles and features. In the illustrated example embodiment, the user interface, including the input selectors 60, is located on backsplash 56. It should be understood, however, that the controller 100 and the user interface may each be positioned in a variety of locations throughout washing machine appliance 50. Further, it should be understood that a remote interface, such as but not limited to an app running on a smartphone which communicates with the controller 100 wirelessly, e.g., via WIFI or BLUETOOTH, etc., may be provided as well as or instead of the input selectors 60.

Appliance controller 100 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. For example, the instructions may include a software package configured to execute a portion of the example method 200, described below with reference to FIGS. 3 through 6. The memory may be a separate component from the processor or may be included onboard within the processor. Alternatively, appliance controller 100 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50, such as the door 62, pump assembly 90, motor 94, valve 74, pressure sensor 96, and various other sensors, etc. may be in communication with appliance controller 100 via one or more signal lines or shared communication busses. It should be noted that controllers 100 as disclosed herein are capable of and may be operable to perform any methods and associated method steps as disclosed herein. For example, in some embodiments, methods disclosed herein may be embodied in programming instructions stored in the memory and executed by the controller 100.

It should be appreciated that the present subject matter is not limited to any particular style, model, or configuration of washing machine appliance. The exemplary embodiment depicted in FIGS. 1 and 2 is simply provided for illustrative purposes only. While described in the context of a specific embodiment of vertical axis washing machine appliance 50, it will be understood that vertical axis washing machine appliance 50 is provided by way of example only. Other washing machine appliances having different configurations, different appearances, and/or different features may also be utilized with the present subject matter as well. For example, different locations may be provided for the user interface, different configurations may be provided, e.g., horizontal axis washing machines, and other differences may be applied as well.

Figure 4:
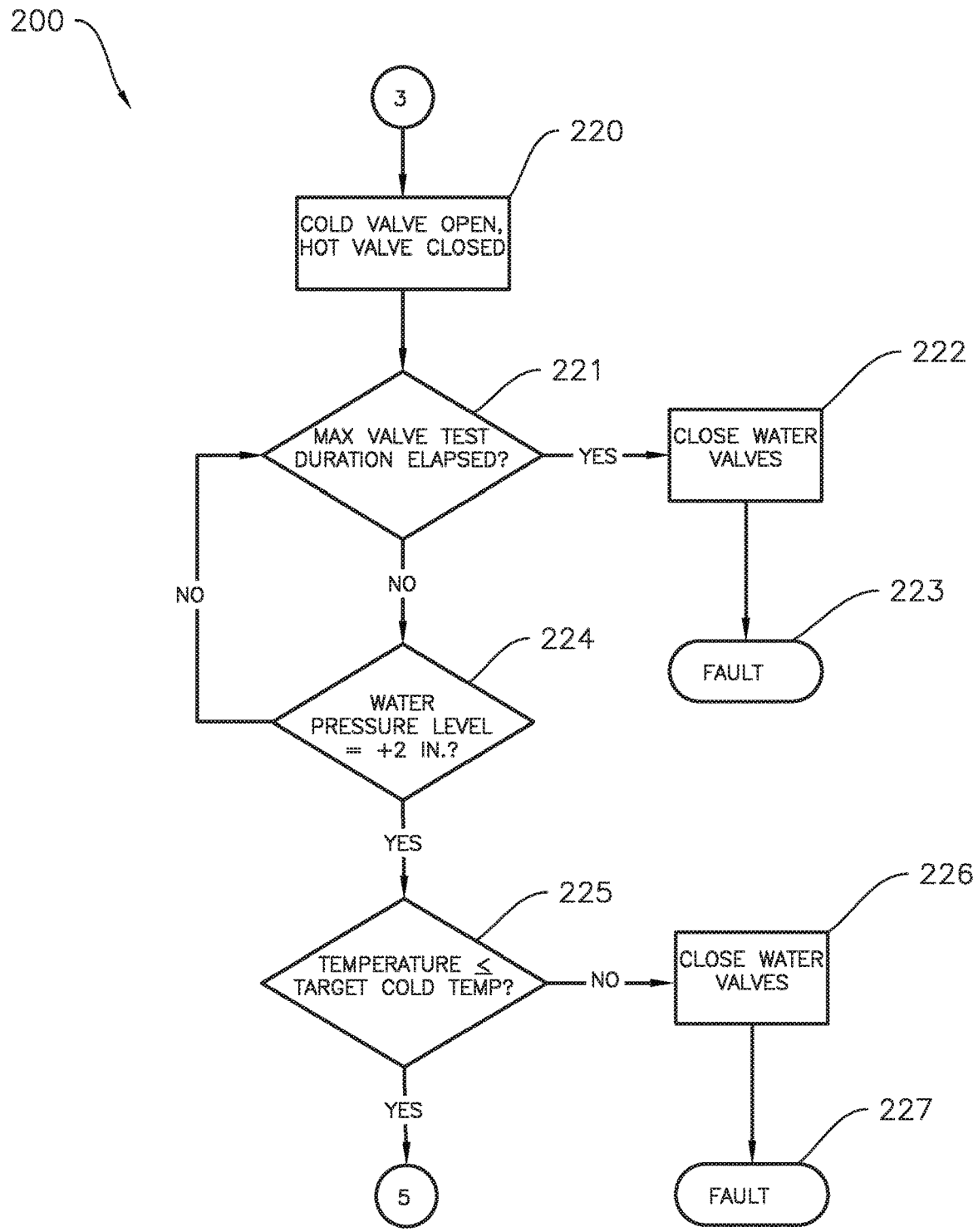
FIG. 4 provides a flow chart illustrating additional steps of the method of FIG. 3.
Figure 5:
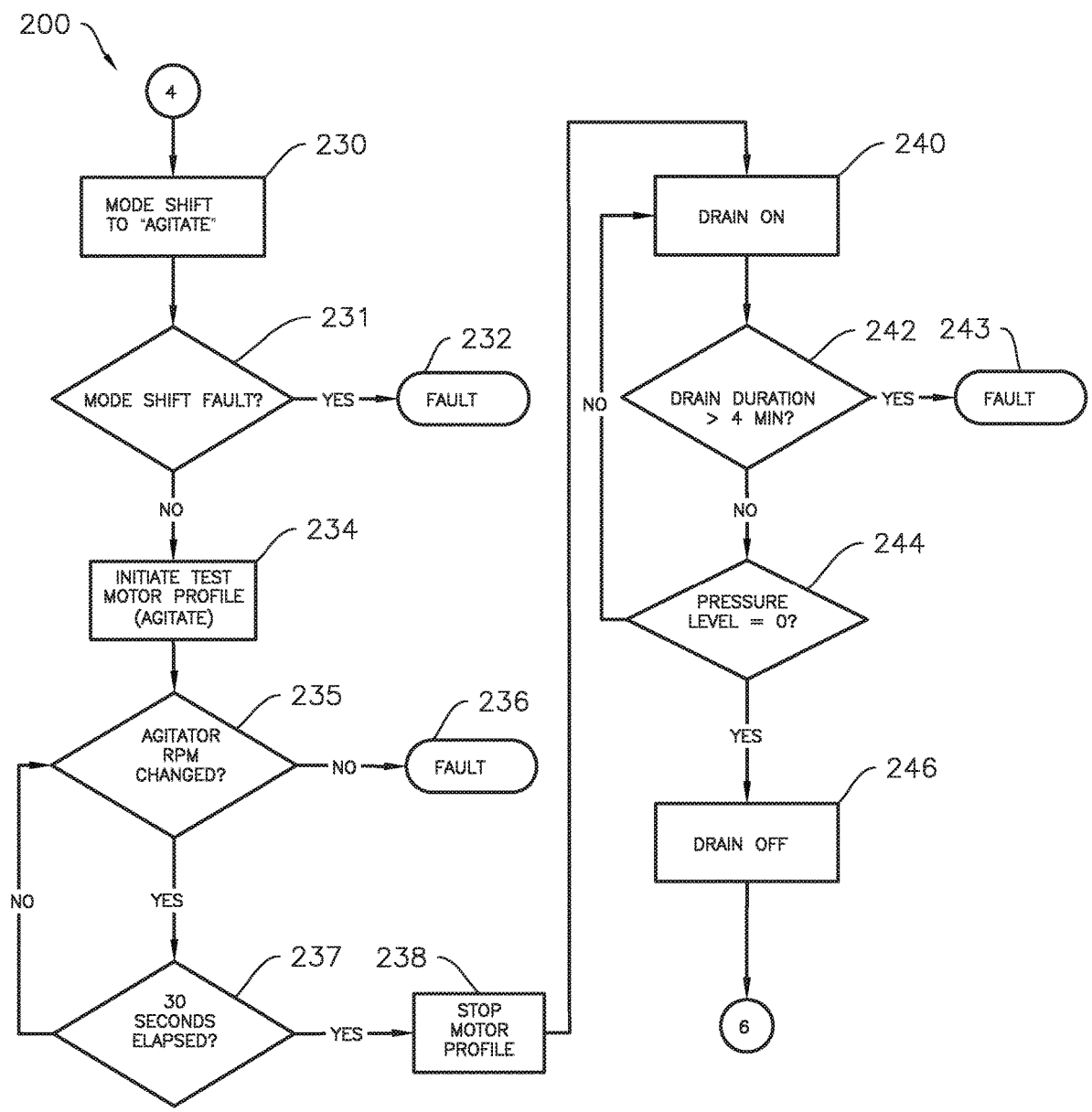
FIG. 5 provides a flow chart illustrating additional steps of the method of FIGS. 3 and 4.
Figure 6:
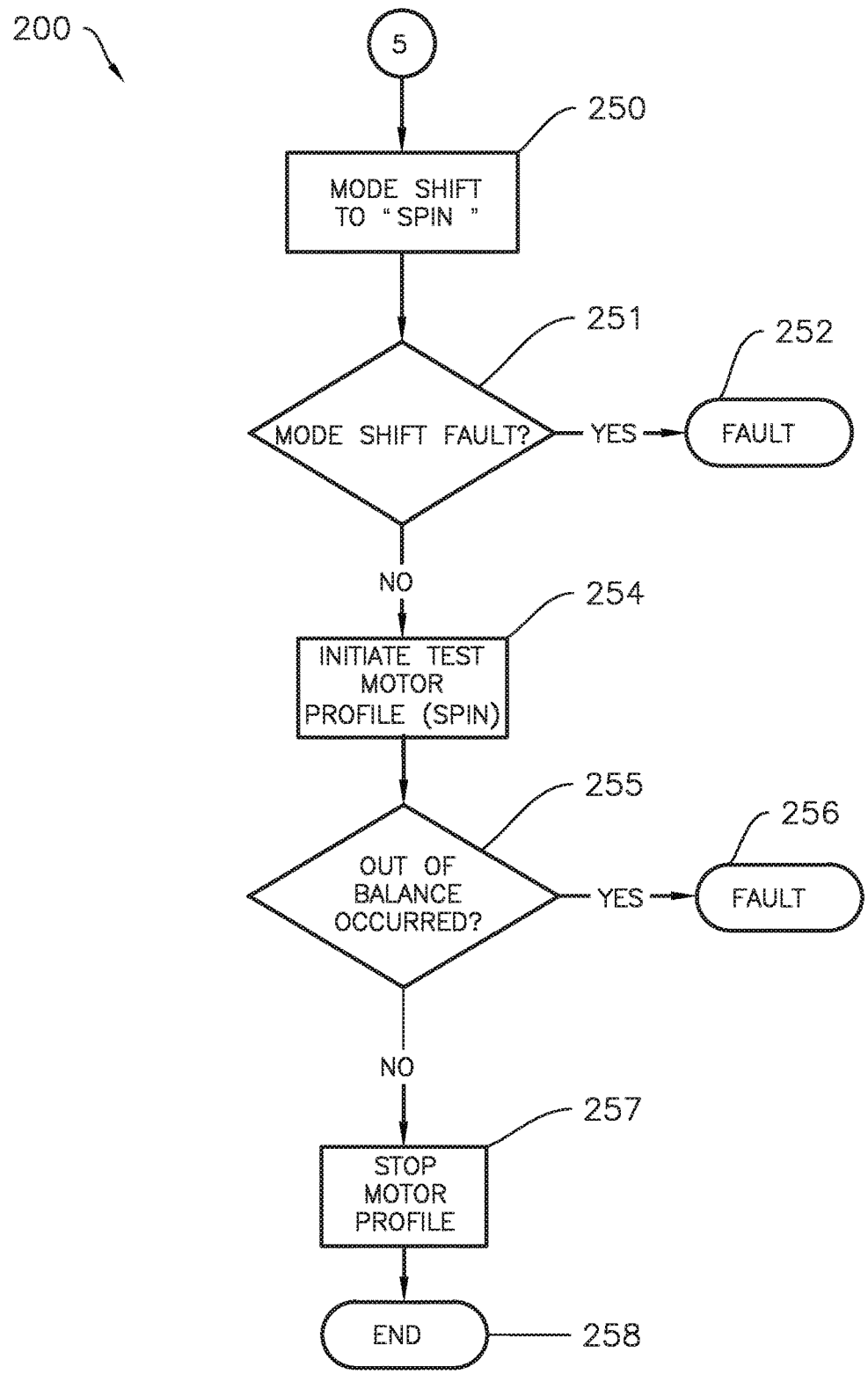
FIG. 6 provides a flow chart illustrating additional steps of the method of FIGS. 3 through 5.

Turning now to FIGS. 3 through 6, an example embodiment of a method 200 of testing a washing machine appliance 50 in accordance with the present disclosure is illustrated in a flow chart diagram. In various embodiments, the method 200 includes performing a first fill test beginning at step 210 (FIG. 3), performing a second fill test beginning at step 220 (FIG. 4), performing an agitate test beginning at step 230 (FIG. 5), performing a drain test beginning at step 240 (FIG. 5), and performing a spin test beginning at step 250 (FIG. 6). Each of the steps of performing the first fill test, performing the second fill test, performing the agitate test, performing the drain test, and performing the spin test may advantageously be performed in a continuous process, which in at least some embodiments is a single continuous process. For example, the method may be initiated by entering a sequence of inputs via input selectors 60 and once initiated, the method will complete all of the tests in a single continuous sequence without requiring any further input or other actions by a user or installer. The various tests may be performed in any suitable order, for example, either of the hot water fill test or the cold water fill test may be performed before the other. As described in more detail below with reference to the illustrated example embodiment of FIGS. 3 through 6, the continuous process generally includes performing each test and then proceeding directly to a next test without interruption or delay, e.g., without any additional input.

The entire method may take less than about fifteen minutes. For example, a total time duration for all of the steps of performing the first fill test, performing the second fill test, performing the agitate test, performing the drain test, and performing the spin test may be less than about fifteen minutes. The total time duration may also be, for example, less than about ten minutes, such as about five minutes. For example, a time duration of each of the first fill test, the second fill test, the agitate test, the drain test, and the spin test may each be less than about five minutes, such as less than about three minutes, such as less than about two minutes, such as about one minute. In various embodiments, the time for each test may be equal to every other test, or some tests may be longer than others while each individual test is performed within the time limits described above and the entire method is completed within the time limits described above. As used herein, terms of approximation such as "about," "generally," or "substantially," are to be understood as including within ten percent greater or less than the stated amount.

Figure 3:
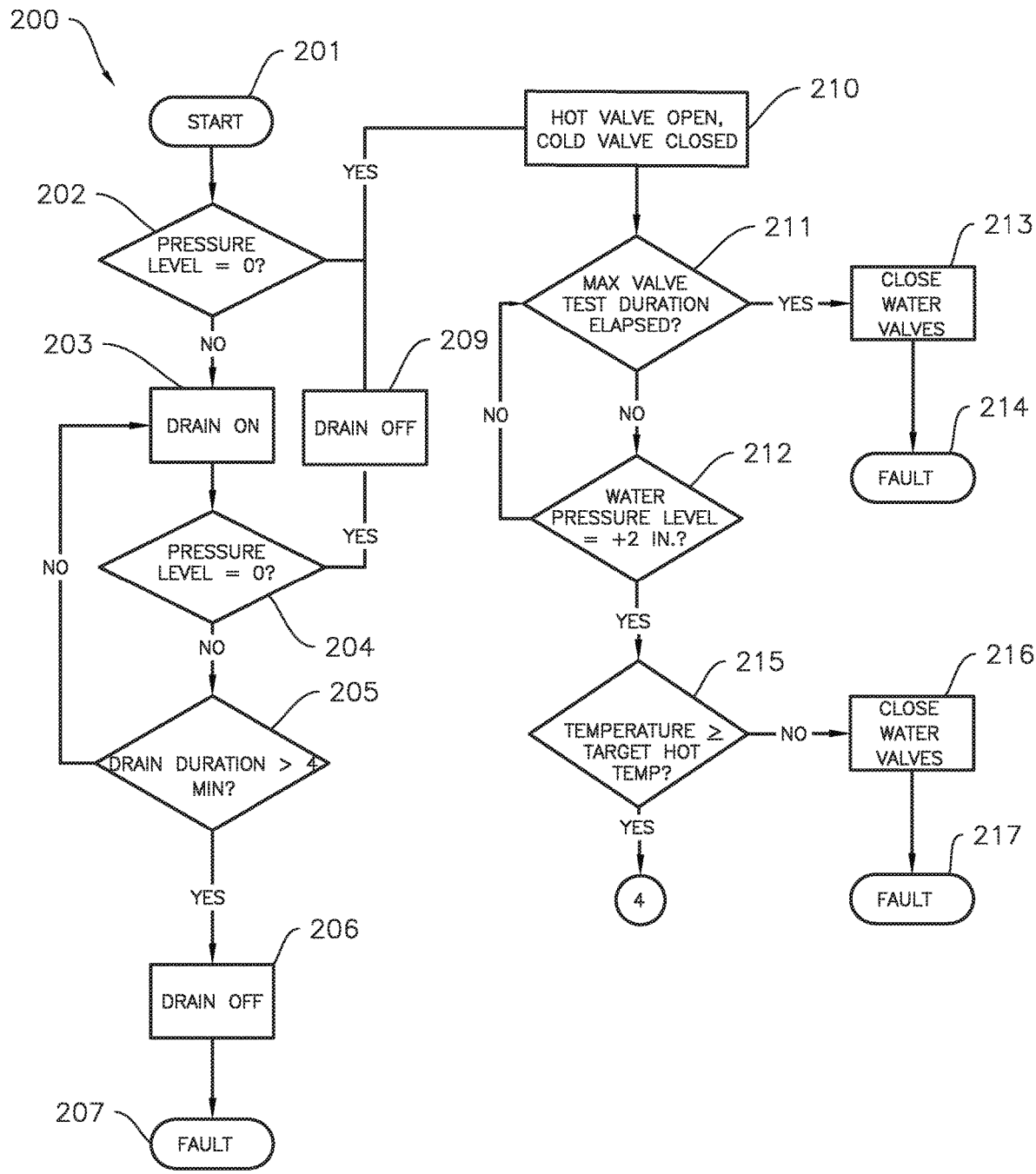
FIG. 3 provides a flow chart illustrating a method of testing a washing machine appliance in accordance with at least one embodiment of the present subject matter.

The first fill test may be, e.g., one of a hot water fill test as illustrated at steps 210 through 217 in FIG. 3 and a cold water fill test as illustrated in steps 220 through 227 in FIG. 4. The second fill test may be the other of the hot water fill test and the cold water fill test. In some embodiments, the method 200 may also include a preliminary drain test, as illustrated for example at steps 202 through 209 in FIG. 3. For example, the method 200 may begin at a start point 201, for example in response to a key sequence entered on input selectors 60. Method 200 may also include measuring a water pressure level prior to performing the first fill test, e.g., to determine at step 202 whether the water pressure level is zero. For example, the water pressure level may be measured by pressure sensor 96. When the measured water pressure level is greater than a fill threshold, e.g., zero in the illustrated embodiment, the method 200 may include performing a first drain test or preliminary drain test prior to the first fill test. As illustrated at step 202, when the pressure level is not zero, e.g., the pressure level greater than zero, the preliminary drain test may include such steps as activating the drain, e.g., turning on a drain pump which may be a part of drain pump assembly 90, at step 203, and monitoring the pressure level at step 204. When the monitored pressure level in step 204 is zero, the method 200 may include turning the drain off at step 209 and proceeding to the first fill test, e.g., the hot water fill test beginning at step 210. When the monitored pressure level in step 204 is not zero, the method 200 may include monitoring an operational time of the drain pump at step 205. When the monitored operational time of the drain pump in step 205 is less than a drain threshold, e.g., about four minutes, method 200 returns to step 203 and the drain remains on. When the monitored operational time of the drain pump in step 205 is greater than the drain threshold, method 200 may include turning the drain off at step 206 and indicating a fault at step 207. In some embodiments, the indicated fault at step 207 may include a pressure sensor fault and/or a drain pump fault. As described herein, the method 200 may include various steps of indicating a fault at different points in the method, depending on the context in which such fault occurs. Each of the various faults may, for example, be indicated by providing text such as an alphanumeric fault code and/or descriptive text to the display 61.

As mentioned above, the first fill test may be one of the hot water fill test illustrated in FIG. 3 and the cold water fill test illustrated in FIG. 4. For example, as illustrated in FIG. 3, the hot water fill test may include opening a hot water valve, e.g., a hot water side of valve 74, while a cold water valve, e.g., a cold water side of valve 74, remains closed at step 210, such that water is supplied to the tub 64 of the washing machine appliance 50. After opening the hot water valve, the hot water test also includes measuring an amount of fill time and determining, at step 211, whether the amount of fill time has exceeded a maximum valve test duration. The hot water fill test further includes monitoring a water pressure level, e.g., with pressure sensor 96, after opening the hot water valve and determining at step 212 whether the water level, e.g., the height of water in the tub 64, has reached a fill threshold. The fill threshold may be any suitable amount, for example, about two inches as in the illustrated embodiment of FIG. 3, or may be greater, e.g., about one inch, or may be less, e.g., about three inches. The hot water valve will be kept open as long as the maximum valve test duration has not elapsed at step 211 and the water level has not reached the fill threshold at step 212. When the maximum valve test duration has elapsed at step 211 and the water level has not reached the fill threshold at step 212, the valves are closed at step 213 and a fault is indicated at step 214. When the maximum test duration has elapsed prior to the monitored water pressure level reaching the fill threshold, the indicated fault at step 214 may include a low hot water pressure fault and/or a pressure sensor fault. In embodiments where the hot water fill test is performed after the cold water fill test, e.g., the hot water fill test is the second fill test, the indicated fault at step 214 may exclude a pressure sensor fault if the cold water fill test has passed. When the water level, as measured by the monitored water pressure level, has reached the fill threshold at step 212, the method 200 may further include measuring a temperature of the water in the tub 64 of the washing machine appliance 50 and a step 215 of determining whether the measured temperature is greater than or equal to a hot temperature threshold, for example, a target hot temperature. When the measured temperature at step 215 is less than the hot temperature threshold, the method may include closing the water valves at step 216 and indicating a hot water fault at step 217. Indicating the hot water fault in step 217 may include indicating hot water not available, the hot water conduit 78 connected to the cold water supply 75, and/or a temperature sensor fault. When the measured temperature at step 215 is greater than or equal to the hot temperature threshold, the method 200 may then proceed to the second fill test, e.g., the cold water fill test beginning at step 220 in FIG. 4.

In the illustrated embodiment, the cold water test is the second fill test. However, it should be recognized that the order of the fill tests may vary, e.g., the cold water fill test may be the first fill test and the hot water fill test may be the second fill test. As illustrated in FIG. 4, the cold water fill test includes opening a cold water valve, e.g., a cold water side of valve 74, while a hot water valve, e.g., a hot water side of valve 74, remains closed at step 220, such that water is supplied to the tub 64 of the washing machine appliance 50. After opening the cold water valve, the cold water fill test also includes measuring an amount of fill time and determining, at step 221, whether the amount of fill time has exceeded a maximum valve test duration. The cold water fill test further includes monitoring a water pressure level, e.g., with pressure sensor 96, after opening the cold water valve and, at step 224, determining whether the water level, e.g., the height of water in the tub 64, has reached a fill threshold. The fill threshold may be any suitable amount, for example, about two inches as in the illustrated embodiment of FIG. 4, or may be greater, e.g., about one inch, or may be less, e.g., about three inches. The cold water valve will be kept open as long as the maximum valve test duration has not elapsed at step 221 and the water level has not reached the fill threshold at step 224. When the maximum valve test duration has elapsed at step 221 and the water level has not reached the fill threshold at step 224, the valves are closed at step 222 and a fault is indicated at step 223. When the maximum test duration has elapsed prior to the monitored water pressure level reaching the fill threshold, the indicated fault at step 223 may include a low cold water pressure fault and/or a pressure sensor fault. In embodiments where the cold water fill test is performed after the hot water fill test, e.g., the cold water fill test is the second fill test, the indicated fault at step 223 may exclude a pressure sensor fault if the hot water fill test has passed, e.g., if there was no pressure sensor fault in the first fill test, information may be carried forward to later steps of method 200 that the pressure sensor is functional. When the water level, as measured by the monitored water pressure level, has reached the fill threshold at step 224, the method 200 may further include measuring a temperature of the water in the tub 64 of the washing machine appliance 50 and a step 225 of determining whether the measured temperature is less than or equal to a cold temperature threshold, for example, a target cold temperature. When the measured temperature at step 225 is greater than the cold temperature threshold, the method may include closing the water valves at step 226 and indicating a cold water fault at step 227. The cold water fault of step 227 may include indicating cold water not available, the cold water conduit 77 connected to the hot water supply 76, and/or a temperature sensor fault. When the measured temperature at step 225 is less than or equal to the cold temperature threshold, the method 200 may then proceed to the agitate test, e.g., beginning at step 230 in FIG. 5.

As illustrated in FIG. 5, the agitate test may optionally include a step 230 of disengaging mode shifter 99 from basket 70 such that agitation element 92 may be rotated by motor 94 independently of basket 70. The method 200 may also include determining at step 213 whether the mode shifter 99 disengaged, and indicating a mode shift fault at 232 when the mode shifter 99 has not disengaged. In other embodiments, such as when mode shifter 99 is not provided and/or the basket 70 provides agitation, the mode shift step 230 may not be included. When the mode shift step 230 is provided, and no mode shift fault is detected at step 213, the method 200 may then proceed to step 234. In other embodiments, the agitate test may begin at step 234, e.g., the method 200 may proceed directly and continuously from the last step of the second fill test to step 234. As illustrated, an agitate test motor profile is initiated at step 234. The agitate test motor profile generally includes a predetermined sequence of operations which simulates the operating conditions of a full agitate cycle such as the washing machine appliance 50, and in particular motor 94 may perform during a full operational cycle but in a reduced time duration, e.g., such as the time durations described above. In some embodiments, for example as illustrated in FIG. 5, the agitate test may include monitoring the time duration of the agitate test motor profile and determining at step 237 whether a time threshold, e.g., thirty seconds, has elapsed. The agitate test may further include measuring a rotational speed of the agitation element 92 of the washing machine appliance 50 during the agitate test motor profile. As noted above, in some embodiments, the agitation element 92 may be provided on the basket 70 and/or the agitation element 92 may rotate with the basket 70 during agitation operations, e.g., when mode shifter 99 is not provided. In such embodiments, measuring the rotational speed of the agitation element 92 may comprise measuring a rotational speed of the basket 70. When the time threshold of step 237 has elapsed and the measured rotational speed at step 235 has not changed, the method 200 may then include indicating a fault at step 236. The indicated fault at step 236 may include a motor failure, a mode shifter failure, and/or a rotational speed sensor failure. When the time threshold of step 237 has elapsed and the measured rotational speed at step 235 has changed, the method 200 may then stop the agitate test motor profile at step 238 and proceed to a drain test beginning at step 240.

As illustrated in FIG. 5, the drain test may include a "drain on" step 240 of activating the drain pump 90 of the washing machine appliance 50. The drain test may also include monitoring a water pressure level prior after activating the drain pump 90, e.g., to determine at step 244 whether the water pressure level has reached a drain threshold, e.g., zero. For example, the water pressure level may be measured by pressure sensor 96. The method 200 may also include monitoring an operational time of the drain pump. When the monitored operational time of the drain pump in step 242 is less than a maximum test duration, e.g., about four minutes, and the monitored pressure level is not zero, method 200 returns to step 240 and the drain remains on. When the monitored operational time of the drain pump in step 242 is greater than the maximum test duration, e.g., the maximum test duration has elapsed, prior to the monitored water pressure level of step 244 reaching the drain threshold, e.g., zero, method 200 may include indicating a fault at step 243. In some embodiments, the indicated fault at step 243 may include a pressure sensor fault and/or a drain pump fault. When the monitored pressure level in step 244 is zero, the method 200 may include turning the drain off at step 246 and proceeding to the spin test, e.g., as illustrated beginning at step 250 in FIG. 6.

As illustrated in FIG. 6, the spin test may optionally include a step 250 of engaging mode shifter 99 basket 70 such that motor 94 may rotate basket 70. The method 200 may also include determining at step 251 whether the mode shifter 99 engaged, and indicating a mode shift fault at 252 when the mode shifter 99 has not engaged. As noted above in the context of the agitate test, the mode shift step 250 is optional and may not be included, e.g., in embodiments where the mode shifter 99 is not provided. When the mode shift step 250 is provided, and no mode shift fault is detected at step 251, the method 200 may then proceed to step 254. In other embodiments, the spin test may begin at step 254, e.g., the method 200 may proceed directly and continuously from the last step of the drain test to step 254, where a spin test motor profile is initiated. The spin test motor profile generally includes a predetermined sequence of operations which simulates the operating conditions of a full spin cycle such as the washing machine appliance 50, and in particular motor 94, may perform during a full operational cycle but in a reduced time duration, e.g., such as the time durations described above. Accordingly, the spin test motor profile may have a time duration which is predetermined. The spin test may also include monitoring the balance of the basket 70 for an out of balance condition and determining at step 255 whether an out of balance has occurred during the spin test motor profile. When an out of balance condition occurs during the spin test motor profile, the method 200 may then include indicating a spin fault at step 256. When the spin test motor profile of step 254 has completed, e.g., when the predetermined sequence of operations has been fully performed, without an out of balance occurring the method 200 may then stop the spin test motor profile at step 257 and the method of testing the washing machine appliance 50 may end at step 258.

The present method may advantageously be employed to test the installation and functionality of any newly-installed washing machine appliance. The term "newly-installed" is intended to refer brand new washing machine appliances as well as any washing machine appliance installed in a new location, or that for any other reason has not been operated since being installed in the present location and/or configuration of the washing machine appliance. Thus, in various embodiments, the method may be performed after installing the washing machine appliance and prior to a first operational use of the washing machine appliance after installing the washing machine appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of testing a washing machine appliance, the method comprising:
   performing a hot water fill test, the hot water fill test comprising:
      opening a hot water valve to supply water to a tub of the washing machine appliance;
      monitoring a water pressure level after opening the hot water valve;
      measuring a temperature of the water in the tub of the washing machine appliance when the monitored water pressure level reaches a first fill threshold; and
      indicating a hot water fault when the measured temperature when the monitored water pressure level reaches the first fill threshold is less than a hot temperature threshold;
   performing a cold water fill test, the cold water fill test comprising:
      opening a cold water valve to supply water to the tub of the washing machine appliance;
      monitoring the water pressure level after opening the cold water valve;
      measuring the temperature of the water in the tub of the washing machine appliance when the monitored water pressure level reaches a second fill threshold; and indicating a cold water fault when the measured temperature when the monitored water pressure level reaches the second fill threshold is greater than a cold temperature threshold;

performing an agitate test, the agitate test comprising:
initiating an agitate test motor profile;
measuring a rotational speed of an agitation element of the washing machine appliance during the agitate test motor profile; and
indicating an agitate fault when the rotational speed of the agitation element has not changed after a time threshold has elapsed;

performing a drain test, the drain test comprising:
activating a drain pump of the washing machine appliance;
monitoring the water pressure level after activating the drain pump;
deactivating the drain pump when the monitored water pressure level is less than a drain threshold; and
indicating a drain fault when a maximum test duration has elapsed prior to the monitored water pressure level reaching the drain threshold; and performing a spin test, the spin test comprising:
initiating a spin test motor profile;
monitoring a balance of a basket of the washing machine appliance during the spin test motor profile; and
indicating a spin fault when the basket is out of balance;

wherein each of the steps of performing the first fill test, performing the second fill test, performing the agitate test, performing the drain test, and performing the spin test are performed in a continuous process.

2. The method of claim 1, wherein the method is performed after installing the washing machine appliance and prior to a first operational use of the washing machine appliance after installing the washing machine appliance.

3. The method of claim 1, wherein the entire method is performed in less than about fifteen minutes.

4. The method of claim 1, wherein the hot water fill test further comprises closing the hot water valve when a maximum test duration has elapsed and indicating the hot water fault when the maximum test duration has elapsed prior to the monitored water pressure level reaching the fill threshold.

5. The method of claim 1, wherein the cold water fill test further comprises closing the cold water valve when a maximum test duration has elapsed and indicating the cold water fault when the maximum test duration has elapsed prior to the monitored water pressure level reaching the fill threshold.

6. The method of claim 1, wherein the agitate test comprises disengaging a mode shifter prior to initiating the agitate test motor profile.

7. The method of claim 1, wherein the spin test comprises engaging a mode shifter prior to initiating the spin test motor profile.

8. The method of claim 1, further comprising measuring a water pressure level prior to performing the first fill test, and performing a first drain test prior to the first fill test when the measured water pressure level is greater than a fill threshold.

9. A method of testing a washing machine appliance, the method comprising:
performing a first fill test, the first fill test comprising:
opening a first water valve to supply water to a tub of the washing machine appliance;
monitoring a water pressure level after opening the first water valve;
measuring a temperature of the water in the tub of the washing machine appliance when the monitored water pressure level reaches a first fill threshold; and
comparing the measured temperature when the monitored water pressure level reaches the first fill threshold to a first temperature threshold;

performing a second fill test, the second fill test comprising:
opening a second water valve to supply water to the tub of the washing machine appliance;
monitoring the water pressure level after opening the second water valve;
measuring the temperature of the water in the tub of the washing machine appliance when the monitored water pressure level reaches a second fill threshold; and
comparing the measured temperature when the monitored water pressure level reaches the second fill threshold to a second temperature threshold;

performing an agitate test, the agitate test comprising:
initiating an agitate test motor profile;
measuring a rotational speed of an agitation element of the washing machine appliance during the agitate test motor profile; and
indicating an agitate fault when the rotational speed of the agitation element has not changed after a time threshold has elapsed;

performing a drain test, the drain test comprising:
activating a drain pump of the washing machine appliance;
monitoring the water pressure level after activating the drain pump;
deactivating the drain pump when the monitored water pressure level is less than a drain threshold; and
indicating a drain fault when a maximum test duration has elapsed prior to the monitored water pressure level reaching the drain threshold; and performing a spin test, the spin test comprising:
initiating a spin test motor profile;
monitoring a balance of a basket of the washing machine appliance during the spin test motor profile; and
indicating a spin fault when the basket is out of balance;

wherein a total time duration for all of the steps of performing the first fill test, performing the second fill test, performing the agitate test, performing the drain test, and performing the spin test is less than about fifteen minutes.

10. The method of claim 9, wherein each of the steps of performing the first fill test, performing the second fill test, performing the agitate test, performing the drain test, and performing the spin test are performed in a continuous process.

11. The method of claim 9, wherein the method is performed after installing the washing machine appliance and prior to a first operational use of the washing machine appliance after installing the washing machine appliance.

12. The method of claim 9, further comprising measuring a water pressure level prior to performing the first fill test, and performing a first drain test prior to the first fill test when the measured water pressure level is greater than a fill threshold.

13. The method of claim 9, wherein each of the first fill test and the second fill test comprises filling a tub of the washing machine appliance with about two inches of water.

14. The method of claim 9, wherein a time duration of the first fill test is less than about three minutes, a time duration of the second fill test is less than about three minutes, a time duration of the agitate test is less than about three minutes, a time duration of the drain test is less than about three minutes, and a time duration of the spin test is less than about three minutes.

\* \* \* \* \*